Dec. 23, 1952 P. W. GAENSSLE ET AL 2,622,704
DISK BRAKE MECHANISM
Filed Aug. 16, 1950 2 SHEETS—SHEET 1

INVENTORS
Paul W. Gaenssle
BY Joseph H. Coombes.
Maurice A. Crewd
ATTORNEY

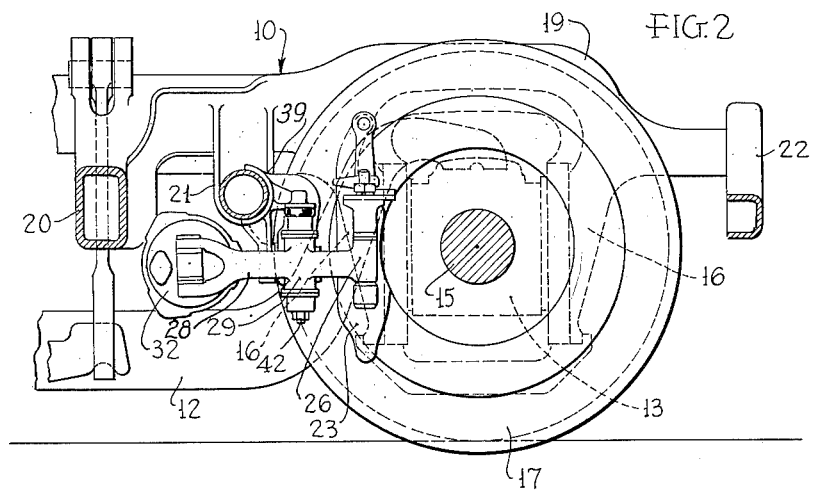
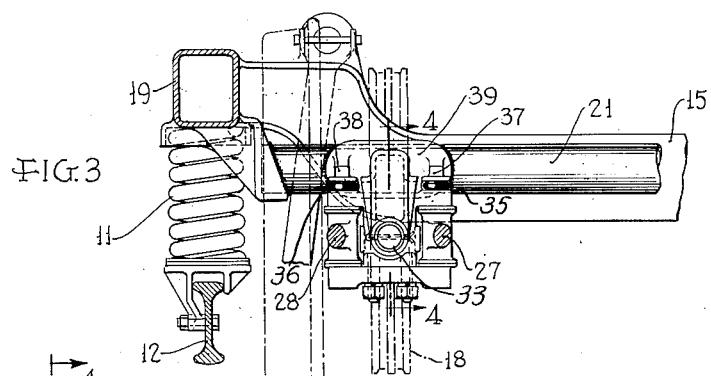
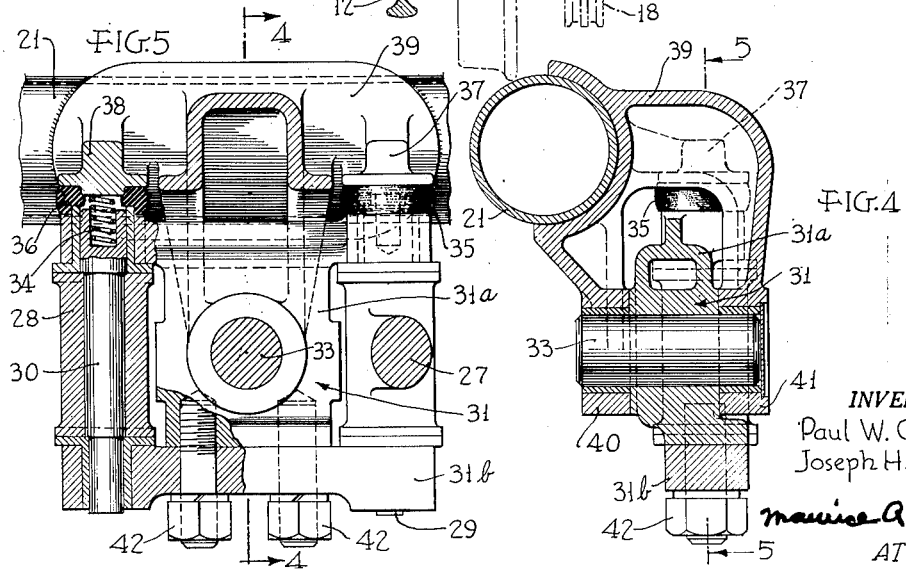

Patented Dec. 23, 1952

2,622,704

UNITED STATES PATENT OFFICE 2,622,704

DISK BRAKE MECHANISM

Paul W. Gaenssle, Ambler, and Joseph H. Coombes, Jenkintown, Pa., assignors to The Budd Company, Philadelphia, Pa., a corporation of Pennsylvania Application August 16, 1950, Serial No. 179,733

5 Claims. (Cl. 188—59)

This invention relates to vehicle brakes, and, more particularly, to disc brakes for association with a railway truck.

Such brakes have heretofore been mounted mainly on a separate C or U-shaped frame, whose ends were carried by the ends of the axle and whose intermediate portion was supported on the truck frame. Such mounting on the axle maintained the shoes carried by the C-frame aligned with the discs carried by the axle.

It is an object of the invention to simplify the brake arrangement and reduce the cost of manufacture as well as decrease the unsprung weight by eliminating the C-frame and supporting the brake shoes associated with each disc directly from the truck frame in such a manner that the shoes are maintained aligned with the braking faces of the discs.

This and other objects and advantages and the manner in which they are attained will become apparent from the following detailed description, when read in connection with the drawings forming a part of this specification.

In the drawings:

Fig. 2 is a longitudinal vertical sectional view, the section being taken substantially on the line 2—2 of Fig. 1;

Fig. 3 is a detail transverse sectional view, the section being taken substantially on the line 3—3 of Fig. 1;

Figure 1:
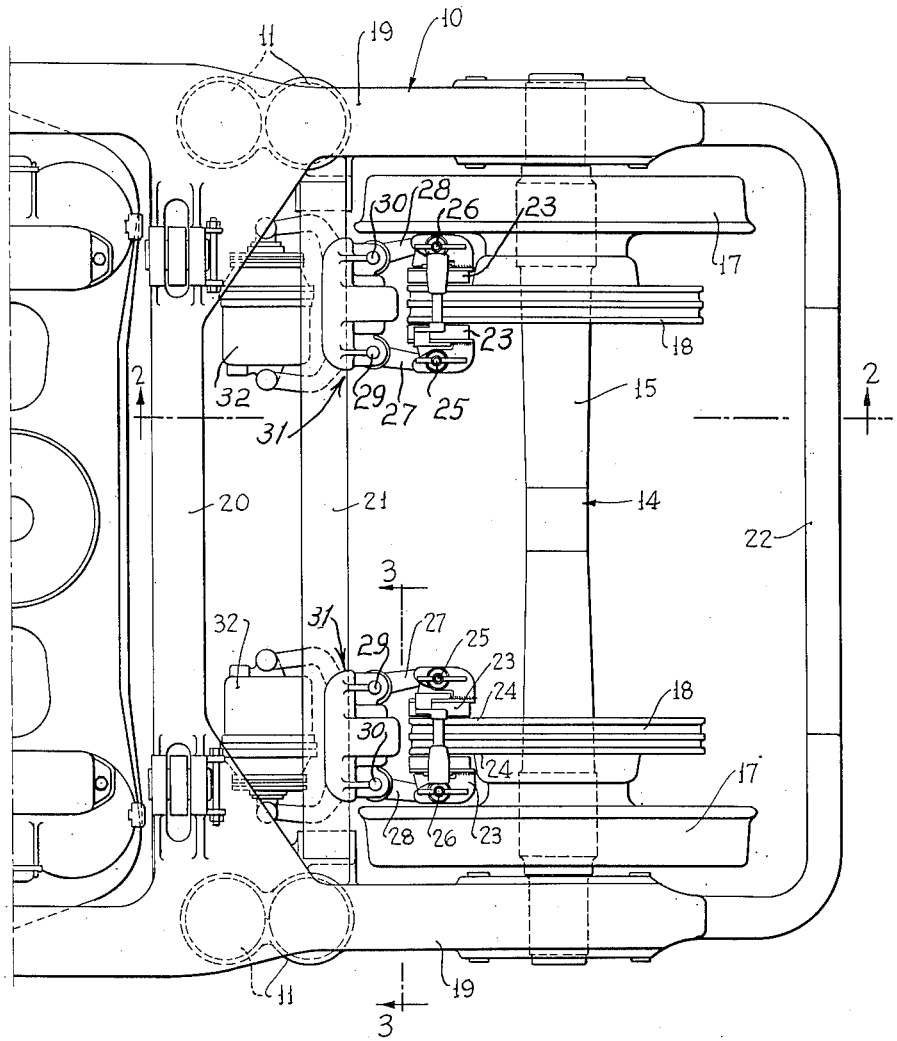
Fig. 1 is a plan view of one-half of a railway truck showing the invention applied thereto.

Fig. 4 is an enlarged detail sectional view, the section being taken substantially on the line 4—4 of Figs. 3 and 5; and Fig. 5 is a detail sectional view, with the section taken substantially on the line 5—5 of Fig. 4.

The truck to which the invention is shown applied comprises a frame 10 spring-supported, through spring nests, as 11, from the equalizers, as 12, having their ends resting on top of the journal boxes, as 13. With this arrangement, the wheel and axle assemblies, as 14, are free to have slight tilting movement with respect to the frame due to unequal deflection of the springs 11 at the opposite sides of the truck.

Each wheel and axle assembly comprises an axle, as 15, whose ends are mounted in the journal boxes 13, and the latter are mounted for vertical sliding movement between pedestal jaws 16, 16, Fig. 2, adjacent the ends of the frame 10. Each wheel and axle assembly further comprises the pair of wheels 17, 17 carried adjacent the axle ends and with each wheel are associated rotary radial brake faces, carried in this instance by brake discs, 18, 18, one secured to each wheel.

The truck frame may comprise the longitudinal side frame elements 19, 19 interconnected by transoms 20, 21 and 22 at each half portion thereof, see Fig. 1.

Separate brake mechanism for cooperating with each of the discs 18 is mounted on the transom 21 opposite each disc, see Fig. 1.

Each brake mechanism comprises a pair of segmental shoes 23, 23 associated with the opposed radial faces 24, 24 of the associated rotary disc 18. These shoes are pivotally supported at 25, 26 respectively, on one of the ends of the brake levers 27, 28 pivoted intermediate their ends on pins 29, 30 carried by a brake support designated generally by numeral 31. The other ends of the levers are interconnected by an actuating cylinder 32, for applying the brakes.

To allow the shoes to follow the movements of the associated disc under the unequal deflections of the springs 11, the brake support 31 carrying the brake levers, and shoes on the opposite sides thereof is mounted on a longitudinally extending pivot pin 33 which is disposed between the pivot pins 29, 30 of the levers, see Fig. 5. As is clearly shown in Fig. 5, the axis of pivot pin 33 lies approximately in the plane which passes through the levers 27, 28. The pivot pins 29, 30 are each backed by a light coil spring, as 34, to hold the brake support in normal central position and to prevent rattling and consequent wear thereof, see Fig. 5.

To seal the parts and further act to assist the springs 34 in yieldingly holding the brake support 31 in normal central position, resilient means, such as rubber cushions, as 35 and 36, are interposed between the upper face of the support, and abutments 37 and 38 on the bracket 39 secured to the transom 21 and carrying the longitudinally extending pivot pin 33 between perforated downward projections 40, 41 thereof, see Fig. 4.

These rubber cushions are designed to yield sufficiently to allow the shoes to follow the movements of the disc, so that their braking faces are in full engagement with the radial faces on the disc at all times during braking.

To facilitate the assembly and disassembly of the shoe supporting levers 27, 28, the pivot pins 29, 30, of the levers are of stepped form, see Fig. 5, and the support 31 is comprised of separate upper and lower parts 31a and 31b in which the pins are journalled. Bolts, as 42, normally hold the parts in assembled relation. By removing the bolts 42, the lower part 31b together with the pins and levers may be downwardly removed, as is obvious from the showing of Fig. 5.

While a specific embodiment of the invention has been herein described in detail, it will be understood that changes and modifications may be made by those skilled in the art without departing from the spirit and scope of the invention as expressed in the appended claims.

What is claimed is:

1. In combination, a wheel and axle assembly, a truck frame spring-supported from the opposite ends of said assembly, wheels carried by said assembly and a brake disc associated with each wheel, brake shoes associated with the opposite faces of each disc, a support for said shoes mounted on the frame to rotate on a longitudinal axis, said support pivotally carrying, on opposite sides of the longitudinal axis, a pair of brake levers, one associated with each of the shoes associated with a disc, said longitudinal axis of the support being located approximately in a plane passing through said brake levers, and means disposed between the brake support and frame on each side of a plane through the axis of said support for yieldingly opposing the rotary movement of said brake support.

2. In combination, a wheel and axle assembly, a truck frame spring-supported from the opposite ends of said assembly, wheels carried by said assembly and a brake disc associated with each wheel, brake shoes associated with the opposite faces of each disc, a support for said shoes mounted on the frame to rotate on a longitudinal horizontal axis, said support pivotally carrying, on opposite sides of said longitudinal axis, a pair of brake levers, one associated with each of the shoes associated with a disc, fixed abutments on said frame in line with the brake lever pivots and means yieldingly opposing the rotary movement of said support including rubber pads in line with said brake lever pivots and interposed between the support and respective fixed abutments on the frame.

3. In combination, a wheel and axle assembly, a truck frame spring-supported from the opposite ends of said assembly, a pair of spaced rotary braking faces associated with said assembly, brake shoes associated with the respective faces of said pair, a support for said shoes mounted on the frame to rotate in a longitudinal axis, said support pivotally carrying an opposite sides of said longitudinal axis, a pair of brake levers, one associated with each of the shoes, said longitudinal axis of the support being located approximately in a plane passing through said brake levers, and means disposed between the brake support and frame on each side of a plane through the axis of said support for yieldingly opposing the rotary movement of the brake support from its normal position.

4. In combination, a wheel and axle assembly, a truck frame spring-supported from the opposite ends of said assembly and including a transversely extending member, a brake disc carried by said wheel and axle assembly, and brake mechanism cooperative with said disc mounted on said transversely extending member, said brake mechanism comprising brake shoes associated with the opposite faces of said disc, a supporting bracket on said transverse member and a support for said shoes mounted to rotate on a longitudinal axis in said bracket, abutments carried by the bracket and arranged on opposite sides of a plane through said axis, and yielding means interposed between said abutments and the support for yieldingly maintaining the shoe support in a normal central position but permitting limited rotation thereof.

5. In combination, a wheel and axle assembly, a truck frame spring-supported from the opposite ends of said assembly and including a transversely extending member, a pair of spaced rotary braking faces carried by said assembly, and brake mechanism cooperative with said braking faces and mounted on said transversely extending member, said brake mechanism comprising brake shoes associated with the respective faces of said pair, a bracket carried by said transversely extending member, a brake support mounted for rotation on said bracket about a longitudinal axis, brake levers carrying the shoes and actuating means therefor, said brake levers being pivotally mounted on said support on opposite sides of a plane through the vertical plane of said axis, said longitudinal axis of the support being located approximately in a plane passing through said brake levers, abutments on said bracket at each side of said vertical plane, and yielding means interposed between said abutments on the bracket and the brake support for yieldingly holding the support in normal central position but permitting limited rotation thereof.

PAUL W. GAENSSLE.
JOSEPH H. COOMBES.

REFERENCES CITED

The following references are of record in the file of this patent:

UNITED STATES PATENTS

| Number | Name | Date |
|---|---|---|
| 2,355,122 | Tack | Aug. 8, 1944 |
| 2,359,788 | Pierce | Oct. 10, 1944 |